Figure 1:
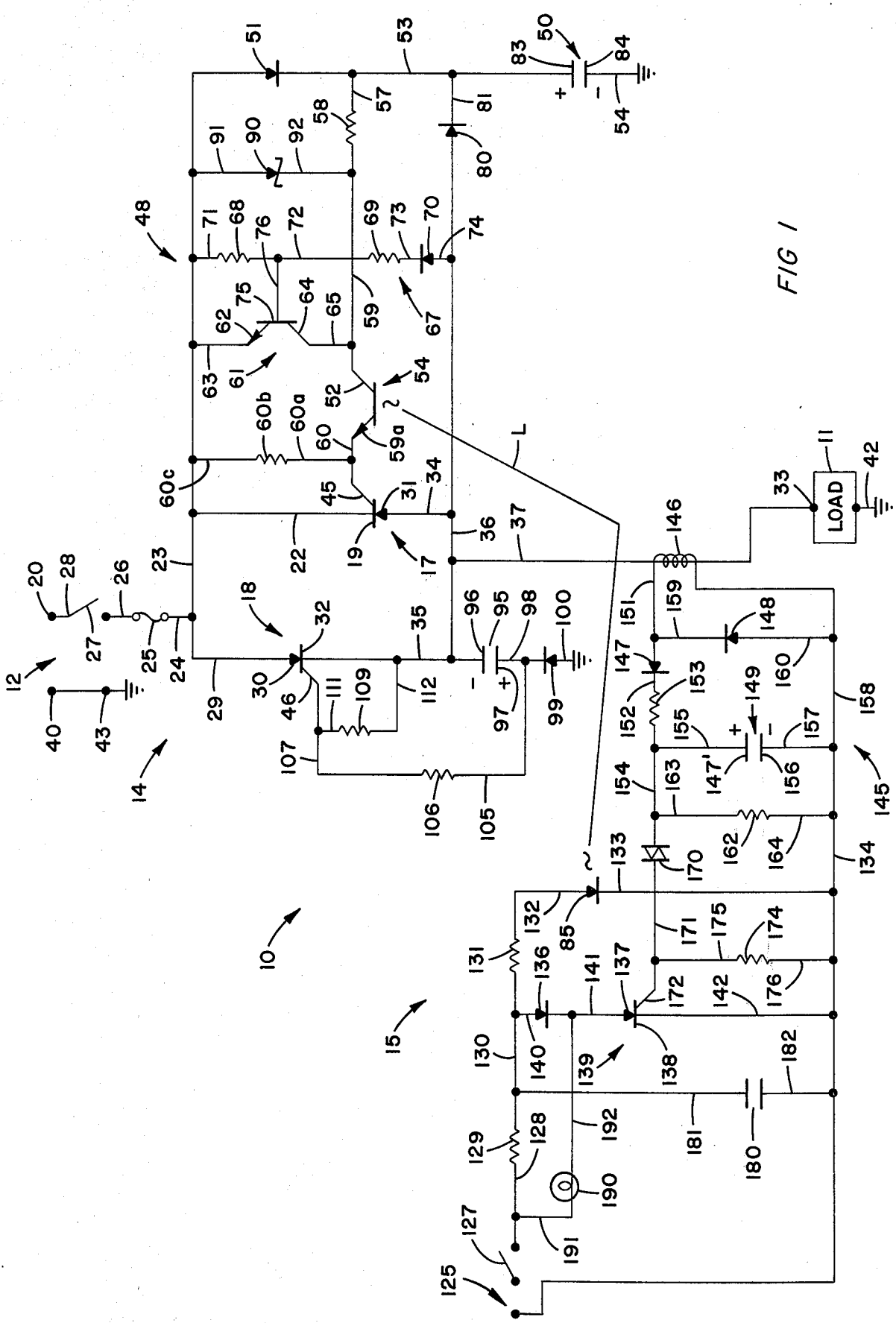

United States Patent [19]
Heinzman et al.

[11] 3,940,684
[45] Feb. 24, 1976

[54] POWER CONTROLLER

[75] Inventors: Homer W. Heinzman, Arlington; Albert J. Marek, Dallas, both of Tex.

[73] Assignee: LTV Aerospace Corporation, Dallas, Tex.

[22] Filed: Feb. 20, 1974

[21] Appl. No.: 444,196

[52] U.S. Cl................. 323/9; 307/252 UA; 323/18; 323/21; 323/24
[51] Int. Cl.².......................................... G05F 3/04
[58] Field of Search............ 307/252 UA; 323/9, 21, 323/18, 22 SC, 24

[56] References Cited
UNITED STATES PATENTS

| | | | |
|---|---|---|---|
| 3,392,284 | 7/1968 | Cain | 323/21 UX |
| 3,548,289 | 12/1970 | Liska et al. | 323/9 |
| 3,648,437 | 3/1972 | Bridges | 323/9 UX |
| 3,701,937 | 10/1972 | Combs | 323/21 UX |
| 3,777,188 | 12/1973 | Mazur | 323/24 X |

OTHER PUBLICATIONS

Circuit Briefs, Semiconductor Newsbriefs, Published by Motorola, Vol. 2 No. 4, 1968, p. 9.
Instruments and Control Systems, Dec. 1972 p. 48.
Semiconductor Power Circuits Handbook, Motorola Inc., First Edition, 1968, pp. 4-8; 4-9; 4-14 to 4-17; 6-5 to 6-7; 6-12; 6-13.

*Primary Examiner*—A. D. Pellinen
*Attorney, Agent, or Firm*—Walter J. Jagmin; H. C. Goldwire; J. M. Cate

[57] ABSTRACT

A power controller for transmitting alternating current from a power input circuit to a load, the controller being a master silicon controlled rectifier, hereinafter the "master rectifier," and a slave silicon controlled rectifier, hereinafter the "slave rectifier," connectible in parallel with the load across the input circuit, a capacitor chargeable during positive half cycles for discharging at the zero voltage crossover between half cycles of positive and negative input voltage to render the master capacitor conductive and a second capacitor chargeable When the master controlled rectifier is conductive whose discharge renders the slave rectifier conductive at the instant of zero voltage crossover between half cycles of negative and positive input voltage. The controller may also include a light sensitive diode connected in series between the control gate of the master rectifier and the first capacitor which is conductive only as long as a light emissive diode is energized and an overload responsive circuit for deenergizing the light emissive diode upon the occurrence of an overload. The controller may also additionally include a shunting transistor for shunting the discharge from the first capacitor from the light sensitive diode during half cycles of negative input voltage to prevent initiation of conduction of the master rectifier at times other than at the instant of zero voltage crossover between half cycles of positive and negative input voltage.

Another form of the power controller may include a DC to DC converter for supplying the power for turning on the master rectifier and for supplying substantially a large proportion of the current for turning on the slave rectifier. In this second form of controller a single capacitor is charged during the periods of conduction of the master rectifier and discharged through an amplifying transistor to the gate of the master rectifier.

6 Claims, 2 Drawing Figures

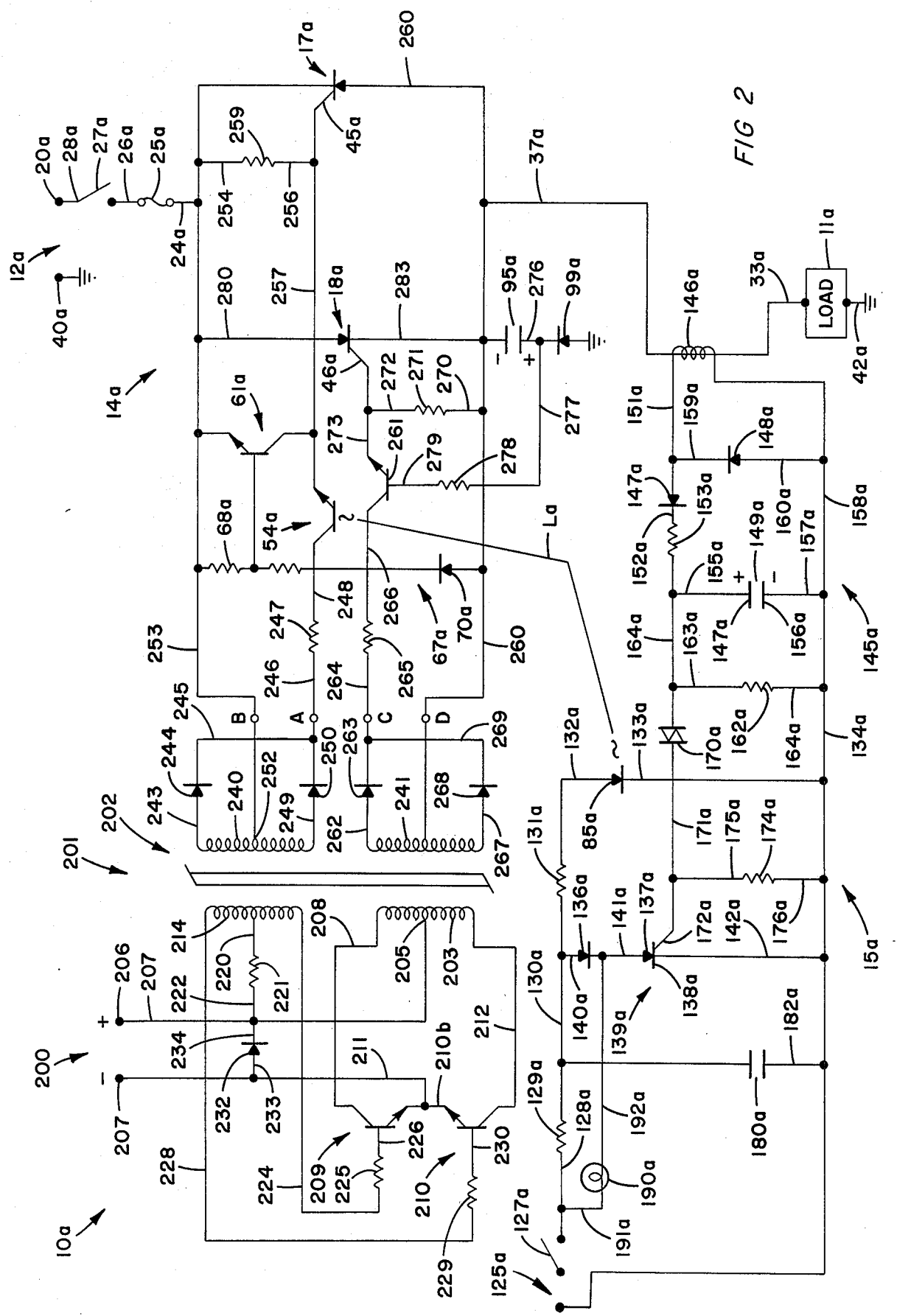

POWER CONTROLLER

This invention relates to control circuits and more particularly to a power control circuit or controller for controlling the flow of alternating current from an alternating current input circuit to a load.

It is desirable that power controllers which control the transmittal of power from an alternating current supply circuit to a load such as inductive, capacitive, lamp or resistant load, have the controller turn on a time of zero voltage of the input circuit to prevent malfunction of, or undesirable transient effects on, the load at the instant of initiation of operation of the load; that the controller turn off upon the occurrence of an overload at the instant of termination of a half cycle of input voltage of one polarity and that it be restarted again only upon the instant of the initiation of a half cycle of input voltage of the opposite polarity to prevent saturation of inductive loads, such as transformers, since such magnetic saturation would result in undesirable voltage spike outputs; that the power controller be restartable from a location remote from the load; and that the overload sensing and restart circuit be electrically isolated from the power transmission circuit.

Accordingly, it is an object of this invention to provide a new and improved power controller for controlling the transmission of power between an alternating current and a load which permits initiation of energization of the load only at the initiation or zero voltage of a half cycle of one polarity of the input voltage and permits disconnection of the load from the input circuit only upon termination of a half cycle of input voltage of the opposite polarity.

Another object is to provide a power controller which has inhibitor means for preventing initiation of operation of transmission of power to the load except at instants of substantially zero input voltage.

Still another object is to provide a power controller which has an overload sensing means responsive to the load current for stopping transmission of current by the power controller to the load upon the occurrence of an overload.

Still another object is to provide a power controller which is of relatively simple construction, has high reliability and long life, is of small size and low weight.

Other object and advantages will be apparent from the specification and claims and from the accompanying drawings illustrative of the invention.

In the drawings:

FIG. 1 is a schematic circuit diagram of the circuit of a power controller embodying the invention; and, FIG. 2 is a schematic circuit diagram of a modified form of the circuit of the power controller.

Referring now to the particular FIG. 1 of the drawings, the alternating current power controller 10 for controlling the energization of a load 11 connectible across a power alternating current power input circuit 12 includes a power transmission circuit 14 connectible in series with the load across the alternating current input circuit 12 and an overload sensing circuit 15 for controlling operation of the power transmission circuit 14.

The power transmission circuit 14 includes a pair of silicon master and slave controlled rectifiers 17 and 18, respectively, which are connected reversely in parallel between the load and the input circuits. The master rectifier 17 transmits half cycles of negative voltage current and the rectifier 18 transmits half cycles of positive voltage current to the load.

The cathode 19 of the master rectifier is connected to one side 20 or input terminal 20 of the alternating current input circuit 12 through the conductors 22, 23 and 24, a fuse 25, a conductor 26, a switch 27 and a conductor 28. The anode 30 of the slave rectifier 18 is also connected to the terminal 20 being connected to the conductor 29. The anode 31 of the master rectifier 17 and the cathode 32 of the slave rectifier 18 are connected to one side 33 of the load by the conductors 34 and 35, respectively, and the conductors 36 and 37. The other side of the load is connected to the other side or input terminal 40 of the alternating power input circuit 12 by the conductor 42, ground and the conductor 43. It will thus be apparent that the master rectifier 17, when it is conductive or "turned on," will conduct current during half cycles of negative input voltage and the slave rectifier 18, when it is turned on, will conduct current during half cycles of positive input voltage.

As is well known to those skilled in the art, the rectifier 17 will be conductive or turned on only when the voltages applied to its anode 31 and its gate 45 are more positive than the voltage applied to its cathode 19. Similarly, the rectifier 18 will be conductive or turned on only when the voltages applied to its anode 30 and its gate 46 are more positive then the voltage applied to its cathode 32.

The polarity and magnitude of the voltage applied to the gate 45 of the master rectifier are controlled by a control circuit 48 of the power transmission circuit 14 which includes a capacitor 50 which, during each half cycle of positive input voltage is charged through a diode 51, the diode 51 and the capacitor 50 being connected between the main power conductor 23 and ground through the conductors 53 and 54, a ground and therefore across the input circuit 12.

The common connection of the diode 51 and the capacitor 50 is to connect to the collector 52 of a light sensitive transistor 54 through a conductor 57, a resistance 58 and a conductor 59 while its emitter 59a is connected to the gate by a conductor 60. The control circuit 48 also includes an inhibiting transistor 61 whose emitter 62 is connected to the main conductor 22 by a conductor 63 and whose collector 64 is connected to the conductor 59 by a conductor 65.

Biasing potential is applied to the base 75 of the inhibiting transistor 61 to render it conductive during each half cycle of negative input voltage by a voltage divider bridge 67 which includes the resistances 68 and 69, and a diode 70 connected across the conductors 22 and 34 by means of the conductors 71, 72, 73 and 74. The common connection of the resistances 68 and 69 is connected to base 75 of the transistor through the conductor 76. The conductor 60 is connected to the main conductor 22 through a conductor 60a, a resistance 60b and a conductor 60c.

It will be apparent that the charge on capacitor 50 is transmitted to the gate 45 only during such times as the light sensitive transistor 54 is conductive.

Biasing potential for turning on transistor 61 is provided by voltage divider bridge 67 which is connected to the anode 31 of the master rectifier by conductors 74, 36 and 34 and to the cathode by conductors 71, 23 and 22. During half cycles of positive input voltage, the diode 70 prevents any conduction of reverse current through the base 75 of transistor 61.

A diode 80 is connected between the conductors 36 and 53, by a conductor 81. The purpose of the diode 80 will be explained below.

During each half cycle of positive voltage, the inhibiting transistor 61 is off and the capacitor 50 is charged through the diode 51 to the polarity indicated in FIG. 1 wherein its plate 83 is at a positive potential and its plate 84 is at negative or ground potential.

During a half cycle of positive voltage, assuming that the photo sensitive transistor 54 is now conductive which is only during the periods of time during which a light emitting diode 85 is energized, positive potential is applied to the gate 45 of the master rectifier 17 but it cannot be turned on since the voltage at its anode, as compared to the voltage at its cathode, is not positive. As the positive voltage of the input circuit reaches zero voltage crossover, i.e., when the positive going voltage decreases to zero and the negative half cycle starts, the anode voltage at the anode 31 turns positive relative to the voltage at the cathode 19 and, since the capacitor 50 is now charged and discharges through the gate-cathode circuit of the master rectifier, supplying the necessary triggering power to the master rectifier 17, the master rectifier is turned on. Simultaneously, during the negative half cycle of input voltage the inhibiting transistor 61 is turned on and will at some instant of time, very shortly after the initiation of the negative half cycle, and after the discharge of the capacitor 50, cause negative voltage to be applied to the gate 45 of the master rectifier. This ensures that the master rectifier cannot be triggered on except near, or at a short time after the occurrence of the zero voltage crossover.

A Zener diode 90 is connected between the main conductor 22 and the conductor 59 through the conductors 91 and 92 to limit the power applied to the gate 45 since the Zener diode is rendered conductive when the voltage thereacross exceeds a predetermined value to bypass excess current or power from the discharging capacitor 50. The Zener diode is provided to protect the transistors 54 and 61.

The operation of the slave rectifier 18 is dependent upon the operation of the master rectifier 17, i.e., the rectifier 18 is "slaved" to the rectifier 17.

The slave rectifier 18 is rendered conductive or turned on by the discharge of a capacitor 95 which is charged during each half cycle of negative input voltage, i.e., when the master rectifier 17 is conductive. The capacitor 95 has one side or plate 96 connected to the anode of the rectifier 17 through the conductors 36 and 34 and has its other side 97 connected to ground through the conductor 98, a diode 99 and a conductor 100. As the capacitor 95 is charged to the polarities indicated in FIG. 1, during each half cycle of negative input voltage during the half cycle of conduction of the master rectifier 17, a positive voltage is applied to the gate 46 of slave rectifier 18, the common connection of the plate 97 and the diode 99 being connected to the gate 46 through the conductor 105, a resistance 106 and conductor 107. A resistance 109 is connected between the common connection of the resistance 106 and the gate 46 by the conductor 111 and to conductor 35 by the conductor 112.

During any negative half cycle of input voltage, even though the gate 46 has a positive potential applied thereto, the slave rectifier will remain non-conductive since the voltage applied to its anode 30 is negative relative to the voltage applied to the cathode 32 thereof. At the instant of zero voltage crossover of a half cycle of negative input voltage to a half cycle of positive input voltage, if the master rectifier was conductive during the immediately preceding negative half cycle of voltage, the rectifier 17 will be rendered non-conductive or turned off since a negative voltage will now be applied to its anode 31 while simultaneously the slave rectifier 18 will be rendered conductive or turned on since the voltages applied to its gate and its anode are now positive relative to the voltage of its cathode 32. The capacitor 95 will discharge through the resistance 106 and the gate to cathode circuit of the rectifier 18.

Electric current is therefore conducted during the positive half cycles of the input voltage through the slave rectifier 18 and during the negative half cycles of negative input voltage through the master rectifier 17.

The master rectifier can be turned on only at the points of zero voltage crossover between successive half cycles of positive and then negative input voltage of the input circuit 12 and the rectifier 18 can be turned on only during the half cycles of positive input voltage following negative half cycles during which the master rectifier was conducting, therefore the power is delivered to the load 11 in full cycle increments. If the photo sensitive transistor 54 is rendered non-conductive at any time, as, for example, during a half cycle of negative voltage, the master rectifier 17 will remain conductive during the remainder of such half cycle and the slave rectifier 18 will then be conductive during the next succeeding half cycle of positive voltage. At the end of such succeeding half cycle of positive input voltage, since the transistor 54 is off, no positive voltage can be applied to the gate 45 of the master rectifier and, accordingly, the master rectifier 17 will be non-conductive. As a result, the capacitor 95 will not be charged during such half cycle of positive input voltage and will not therefore turn on rectifier 18 at the start of the next half cycle of positive voltage.

If the light sensitive transistor 54 is then rendered conductive again at any time, as, for example, during a half cycle of negative input voltage and not at a zero voltage crossover from a positive input voltage to a negative input voltage, the rectifier 17 will not be turned on since the inhibiting transistor 61 is conductive during each half cycle of negative input voltage thus bypassing the charge of the capacitor 50. The capacitor 95 will now be in a discharged condition and cannot be charged again until the rectifier 17 is rendered conductive. Thus the slave rectifier 18 will be non-conductive during the next half cycle of positive input voltage.

The overload sensing circuit 15 includes the light emitting diode 85 which is connected across an input circuit 125 of direct current through a reset control or switch 127, a conductor 128, a resistance 129, a conductor 130, a resistance 131, and the conductors 132, 133 and 134. A bypass or clamping circuit diode 136 and the anode 137-cathode 138 circuit of a silicon controlled rectifier 139 are connected in series across the resistance 131 and the light emitting diode 85 by means of the conductor 130, 140, 141 and 142.

The anode cathode circuit of the silicon controlled rectifier 139 and the diode 136 provide a very low impedance circuit for current when the rectifier 139 is turned on thus shunting current from, or preventing flow of current through, the light emitting diode 85.

The rectifier 139 is rendered conductive or triggered on when the current drawn by the load exceeds a predetermined value by a trigger circuit 145 which includes a coil 146 wound about the conductor 37 through which the load current flows so that an alternating current is induced in the coil 146 which varies in accordance with the value of the alternating current flowing through the conductor 37, and therefore, through the load 11. The current induced in the coil 146 is rectified by a pair of diode rectifiers 147 and 148 and used to charge a capacitor 149. One side of the coil 146 is connected to one side or plate 147' of the capacitor 149 by the conductor 151, the diode 147, a conductor 152, a resistance 153 and conductor 155. The other side or plate 156 of the capacitor is connected to the other side of the coil 146 by the conductors 157 and 158. The diode 148 is connected between the conductors 151 and 158 and thus across the coil 146 by the conductors 159 and 160.

The charge on the capacitor 149 is continuously being drained by a drain resistor 162 connected between the conductors 154 and 134, and thus across the capacitor 149, by the conductors 163 and 164. The side 147' of the capacitor 149 is connected to the gate 172 of the rectifier 139 through the conductors 155 and 154, a diac 170 and the conductor 171. It will be apparent that when the charge across the capacitor rises to the predetermined firing value of the diac 170, the diac is rendered conductive and the capacitor 149 is discharged through the diac and the gate 172-cathode 138 circuit of the rectifier thus turning on or rendering conductive the rectifier. A resistance 174 is connected between the common connection of the diac and of the gate 172 by conductors 171 and 175 and its other side being connected to the conductor 134 by the conductor 176.

A capacitor 180 is connected across the diode 136 and the rectifier 139, one side thereof being connected to the conductor 130 by the conductor 181 and its other side being connected to the conductor 134 by the conductor 182. The capacitor 180 serves as a delay during the turning on or reset of the sensing circuit 15 to bypass transients at this time.

In use, when the switches 27 and 127 are closed, the rectifier 139 is non-conductive and the light emitting diode 85, which is in physical proximity, as indicated by the line L in the drawing, to the photo sensitive transistor 54, is immediately rendered conductive and in turn as the light emitted thereby falls upon the photo sensitive transistor 54, the transistor 54 is rendered conductive. During the first half cycle of positive input voltage of the input circuit 12 after the closure of the switch 27, the capacitor 50 is charged and at the time of the zero voltage crossover of the such first half cycle of positive input voltage to the succeeding first half cycle of negative input voltage, the master transistor 17 is turned on and transmits current during such first negative half cycle of input voltage to the load 11. During this first half cycle period of conduction of the master rectifier, the capacitor 95 is charged and at the time of zero voltage crossover for the first half cycle of negative input voltage to the second half cycle of positive input voltage, the master rectifier is rendered non-conductive and the slave rectifier 18 is rendered conductive and conducts during the second half cycle of positive voltage input. The inhibiting transistor 61, as was explained before, is rendered conductive soon after each incidence of zero voltage crossover of a half cycle of positive voltage to a half cycle of negative voltage and will remain conductive during the remainder of each half cycle of negative voltage.

During such alternate periods of conduction of the master and slave rectifiers, the coil 146 has a current induced therein which varies in accordance with the current flowing through the load 11 and as long as such current does not exceed a critical value, the voltage charge across the capacitor 149 does not exceed the predetermined value at which the diac 170 fires or is rendered conductive. If, due to some condition within the load, the current flowing through the load and therefore through the conductor 37 exceeds the predetermined value, the diac 170 will be rendered conductive and the discharge of the charge on the capacitor 149 will now cause a positive voltage to be applied to the gate 172 of the rectifier 139 and, since its anode 137 is always more positive that the voltage applied to its cathode 138, the rectifier 139 will be rendered conductive thus shunting the current from the light emitting diode 85 which is thus deenergized. Simultaneously with the deenergization of the light emitting diode 85, the light sensitive transistor 54 is rendered non-conductive.

If at the instant of time the light sensitive transistor 54 is rendered non-conductive the master rectifier is conductive, i.e., during a negative half cycle of voltage across the input circuit 12, the rectifier 17 will remain conductive until the point of zero voltage crossover between such negative half cycle of voltage and the next succeeding positive half cycle of voltage. The slave transistor in turn will be rendered conductive during such next succeeding half cycle of positive voltage. At the initiation of the next or second half cycle of negative voltage, however, the charge on the capacitor 50 will not be transmitted to the gate 45 since the light sensitive transistor 54 is now non-conductive and, accordingly, the master rectifier will remain non-conductive during such second half cycle of negative voltage. Since the capacitor 95 will now not be charged during the second half cycle of negative voltage, the slave rectifier will also remain non-conductive.

Following an incidence of overcurrent in the load, the power transmission circuit 14 will now be held inoperative since the rectifier 139 will remain turned on. When it is desired to restart the power controller, the control switch 127 is opened momentarily to deenergize or turn off the rectifier 139. The reset switch 127 is then again closed but the rectifier 139 will not be rendered conductive because the capacitor 149 is now in discharged condition. As a result, the diode 85 will be energized and will immediately render the light sensitive transistor 54 conductive. if the transistor 54 is rendered conductive at an instant of time during a half cycle of positive input voltage, the slave rectifier is not rendered conductive even though its anode 30 is at a positive voltage relative to its cathode 32 since its gate 46 is not now at a more positive potential relative to its cathode. The master rectifier 17 will be rendered conductive at zero voltage crossover to a negative half cycle of voltage when capacitor 50 is charged to a value sufficiently great to trigger the master rectifier.

Should the light sensitive transistor 54 be rendered conductive at an instant of time during a half cycle of negative input voltage, the master rectifier will not be rendered conductive because at that same instant the inhibiting transistor 61 is conductive. It will therefore be seen that upon each initiation of operation of a power controller 10, the master rectifier 17 will be rendered conductive at the instant of zero voltage crossover between a half cycle of positive input voltage to the next succeeding half cycle of negative input voltage and that the slave transistor can be rendered operative only after the master rectifier has been conductive.

It will also be seen that the slave rectifier 18 will always operate during the next half cycle of positive input voltage after an overload condition across the load has caused the diac 170 to fire even should such overload condition occur during a half cycle of negative input voltage or a half cycle of positive input voltage.

If desired, the overloading sensing circuit 15 may be provided with an indicator, such as a lamp 190, which is energized when the rectifier 139 is conductive having one side thereof connected by a conductor 191 to the conductor 128 and its other side connected to the conductor 141 by the conductor 192.

The power transmission circuit 14 is protected against voltage transients or spikes generated in the load since the capacitor 95 and the diode 99 provide a shunt for negative voltage spikes and the diode 80 and the capacitor 50 provide a shunt for such positive voltage spikes.

It will now be seen that a new and improved power control system has been illustrated and described for controlling the energization of a load connectible across an input circuit of alternating current which includes a power transmission circuit 14 and an overload sensing and control circuit 15 which is electrically isolated from the power transmission circuit.

It will further be seen that the reset or control switch and the indicator 190 may be located remote from the load and from the power transmission circuit since obviously it is desirable that the power transmission circuit be located adjacent the load to limit power line transmission losses.

It will now be seen that a new and improved power control system for controlling the transmission of alternating current power to a load has been illustrated and described which insures that the power to the load is always turned off at the end of one half cycle of power input voltage, in the illustrated and described case a half cycle of positive input voltage, and is always turned on the instant of zero crossover voltage from a half cycle of positive input voltage to a half cycle of negative input voltage, prevents undesirable magnetic saturation effects in inductive loads which could cause undesirable current surges, such surges occurring if the initial half cycle of input voltage at the instant of turn on is of the same polarity as the last half cycle of input voltage, at the time of turn off. Since the master rectifier is always turned on at an instant of zero voltage crossover of the alternating current of two half cycles of input voltage the load is never subjected to full current at the instant of its connection across the alternating input circuit 12.

Referring now particularly to FIG. 2 of the drawings, the power controller 10a is similar to the power controller 10 illustrated in FIG. 1 and, accordingly, its elements have been provided with the same reference numerals, to which the subscript "a" has been added, as the corresponding elements of the power controller 10.

The power controller 10a differs from the power controller 10 principally in that most of the power for operating or turning on the master and slave rectifiers 17a and 18a, respectively, is supplied from a direct current input circuits 200 instead of from the alternating current input circuit 12a. The controller 10a includes a DC to DC converter 201 which has two electrically isolated DC outputs: A-B and C-D. The controller 10a now to be described is one example of the various types of suitable DC-DC converters, and has a transformer 202 provided with a primary winding 203 whose electrical midpoint or tap 205 is connected to one side or terminal 206 of the direct current input circuit 200 through the conductor 207. One side of the primary winding is connected to the other side or terminal 207 of the input circuit 200 through the conductor 208, the emitter-collector circuit of a transistor 209 and the conductors 210b and 211. The other side of the primary winding is connected to the input terminal 207 through a conductor 212, the emitter-collector circuit of a second transistor 210 and the conductors 210b and 211.

The transistors 209 and 210 are rendered alternately conductive by a feedback circuit which includes a secondary winding 214 of the transformer 202. The electric midpoint or tap of the secondary winding 214 is connected to the input terminal 206 of the input circuit 200 through a conductor 220, a resistance 221 and the conductors 222 and 207. One side of the primary winding is connected to the base of the first transistor 209 through the conductor 224, a resistance 225 and a conductor 226 while its opposite side is connected to the base of the second transistor through a conductor 228, a resistance 229 and a conductor 230. A diode 232 is connected across the conductors 211 and 207 by the conductors 233 and 234.

The converter 201 being well known by those skilled in the art, its mode of operation will not be described in detail, it being well known that the transistors 209 and 210 are alternately rendered conductive, at a frequency predetermined by the characteristics of the transistors and the inductance and impedance values of the transformer windings and of the resistors 221, 225 and 229, to induce alternating currents in the secondary windings 240 and 241 of the transformer 201.

The DC output A-B is employed to provide power for turning on the master rectifier 17a while the DC output C-D is used to provide most of the power to turn on the slave rectifier 18a. DC output A is connected to the collector of the transistor 54a through a conductor 246, a resistance 247 and a conductor 248. The negative side B of this DC-DC converter output is connected to the cathode of rectifier 17a by conductor 253. The gate 45 of the master rectifier 17a is connected to the emitter of the transistor 254 by a conductor 257 so that the positive current from DC-DC converter output A is transmitted by the photo sensitive transistor 54a, when it is conductive, to the gate-cathode circuit of the master controller. It will be apparent that a positive potential is applied to the gate 45a at all times except during negative half cycles of the input voltage circuit when the inhibiting transistor 61a is conductive.

Biasing potential for turning on the inhibitor transistor 61a is provided by voltage divider bridge 67a which is connected across the master rectifier as in FIG. 1.

DC-DC converter output C is connected to the collector of an amplifying transistor 261 through a conductor 264, a resistance 265 and a conductor 266. The negative side D of this DC-DC converter output is connected to the cathode of the slave rectifier 18a by conductors 260 and 283.

The common connection of the capacitor 95a and the diode 99a is connected to the base of the transistor 261 through the conductors 276 and 277, the resistance 278 and a conductor 279. The anode of the slave rectifier 18a is connected to the conductor 24a and therefore to terminal 20a of the input circuit 12a through the conductors 24a, 26a and 28a. The cathode of the slave rectifier 18a is connected to the conductor 37a, and therefore to one side of the load 11a, through the conductors 283 and 260 while the anode of the master rectifier is connected by the conductor 260 to the conductor 37a.

The power transmission circuit 14a operates in substantially the same manner as the power transmission circuit 14, the master rectifier 17a being turned on when the photo sensitive transistor 54a is conductive at the zero crossover voltage between a half cycle of positive input voltage and a half cycle of negative input voltage of the input circuit 12a. During each such half cycle of conduction of the master rectifier 17a, the capacitor 95a is charged but the slave rectifier cannot be turned on since a negative voltage is now applied to its anode. At the end of such first half cycle of negative voltage during which the rectifier 17a is conductive, the voltage applied to the anode of the slave rectifier 18a becomes positive relative to its cathode and the discharge of the capacitor 95a amplified by the transistor 261 is effective to provide a turn on current to render the slave rectifier 18a conductive.

As in the power transmission circuit 14, the inhibitor transistor 61a is conductive during half cycles of negative input voltage to prevent turning on of the master rectifier except at the instant of zero crossover voltage between a half cycle of positive input voltage and a half cycle of negative input voltage.

The overload sensing circuit 15a is identical to the sensing circuit 15 and accordingly its mode of operation is identical to that of the overload sensing circuit 15.

It will be apparent that the power controller 10a is somewhat more efficient in transmitting power from the alternating current input circuit 12a to the load since the voltage divider 67a does not draw any current from the input circuit 12a as is the case with the voltage divider 67 of the power transmission circuit 14 wherein a small current is drawn through the voltage divider and the load during all negative half cycles. In addition, the power controller 10a may be of smaller physical dimensions and weight since the capacitor 50 is not necessary and the capacitor 95a may be of considerably smaller size due to the amplifying action of the transistor 261. The power controller 10a therefore may be of more use in airborne applications and the like where small size and weight are of advantage.

While only one embodiment of the invention, together with modifications thereof, has been described in detail herein and shown in the accompanying drawings, it will be evident that various further modifications are possible in the arrangement and construction of its components without departing from the scope of the invention.

What is desired to be secured by Letters Patent of the United States is:

1. A power controller for controlling flow of alternating current from an alternating current input circuit to a load, said controller including:

a power transmission circuit connectible between the input circuit and the load having a master unidirectionally conductive device and a slave unidirectionally conducting device connected reversely in parallel between the input circuit and the load, said devices having control members and remaining conductive, once rendered conductive, during full alternate half cycles of the input voltage;

first means operatively associated with the control member of said master device for rendering said master device conductive during half cycles of voltage of one polarity of the input circuit comprising a capacitor, means for charging said capacitor during each half cycle of a second polarity, and a selectively conductive control means connected in series with and between said control member of said master device and said capacitor for selectively transmitting a potential of said second polarity from said capacitor to said control member of said master devices;

inhibitor means for preventing initiation of conduction of said master device during half cycles of voltage of said one polarity except at substantially the times of zero voltage cross-over between half cycles of said second polarity of the input circuit to half cycles of said one polarity when said control means is conductive; and, means responsive to the operation of said master device operatively associated with said control member of said slave device for rendering said slave device conductive during each half cycle of input voltage of said second polarity only after each period of conduction of said master device during a half cycle of input voltage of said one polarity.

2. The controller of claim 1, and an overload sensing circuit operatively associated with said control means for causing said control means to prevent initiation of said conduction of said master device during a half cycle of input voltage of said one polarity immediately subsequent to the occurrence of said overload condition during a preceding cycle of input voltage of either polarity.

3. The controller of claim 2, wherein said control means includes a photo-sensitive device which is conductive when illuminated and said overload sensing circuit includes a light emissive means for illuminating said photo sensitive device, said light emissive means being rendered inoperable upon the occurrence of an overload condition.

4. The controller of claim 3, wherein said overload sensing means includes means for selectively rendering said light emissive means energizable after occurrence of an overload and de-energization of said light emissive means.

5. The power controller of claim 1, wherein said means responsive to the operation of said master device comprises a second capacitor operatively associated with said master device, means for charging said second capacitor during each half cycle of conduction of said master device, and third means connecting said second capacitor to said control member of said slave device for rendering said slave device conductive during each half cycle of said second polarity after each half cycle of conduction of said master device.

6. The device of claim 5, wherein said first means comprises a photo sensitive means which is conductive when illuminated, and overload sensing means operatively associated with said first means for illuminating said photo sensitive means having means responsive to an overload in said power transmission circuit for de-energizing said illuminating means.

* * * * *